US006661617B1

United States Patent
Hipwell, Jr. et al.

(10) Patent No.: US 6,661,617 B1
(45) Date of Patent: Dec. 9, 2003

(54) STRUCTURE AND FABRICATION PROCESS FOR INTEGRATED MOVING-COIL MAGNETIC MICRO-ACTUATOR

(75) Inventors: Roger Lee Hipwell, Jr., Eden Prairie, MN (US); Lee Walter, Plymouth, MN (US); Wayne Allen Bonin, North Oak, MN (US); Barry Dean Wissman, Eden Prairie, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 565 days.

(21) Appl. No.: 09/657,884

(22) Filed: Sep. 8, 2000

Related U.S. Application Data
(60) Provisional application No. 60/170,842, filed on Dec. 14, 1999.

(51) Int. Cl.⁷ ................................................ G11B 5/48
(52) U.S. Cl. ................................................ 360/294.4
(58) Field of Search .......................... 360/294.4, 291.9, 360/292; 310/311, 328, 330

(56) References Cited

U.S. PATENT DOCUMENTS

| | | | |
|---|---|---|---|
| 5,276,573 A | 1/1994 | Harada et al. | 360/103 |
| 5,629,918 A * | 5/1997 | Ho et al. | 310/40 MM |
| 5,711,063 A | 1/1998 | Budde et al. | 29/603.06 |
| 5,867,347 A * | 2/1999 | Knight et al. | 360/294.5 |
| 5,883,759 A | 3/1999 | Schulz | 360/104 |
| 6,262,868 B1 * | 7/2001 | Arya et al. | 360/290 |

OTHER PUBLICATIONS

Batch Transfer of Microstrucutres Using Flip–Chip Solder Bump Bonding by Angah Signh et al.

Batch Micropacking By Compression–Bonding Wafer–Wafer Transfer by Michael M. Maharbiz et al.

\* cited by examiner

Primary Examiner—George J. Letscher
(74) Attorney, Agent, or Firm—Kinney & Lange, P.A.

(57) ABSTRACT

A moving-coil magnetic microactuator is formed by using a dual silicon wafer structure and thin film technologies such as deep trench reactive ion etching, reactive ion etching, plasma-enhanced chemical vapor deposition and metallo-organinc chemical vapor deposition. Several bottom structures are formed from a bottom wafer, each bottom structure having a coil and wires embedded in the surface of the bottom structure. Several top structures are formed from a top wafer, each top structure having a magnet and mechanical stand-offs. The top structures are bonded to the bottom structures so that the magnet is above the embedded coil, separated by an air gap created by the mechanical stand-offs.

20 Claims, 21 Drawing Sheets

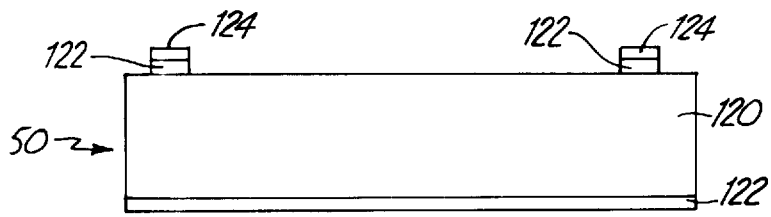
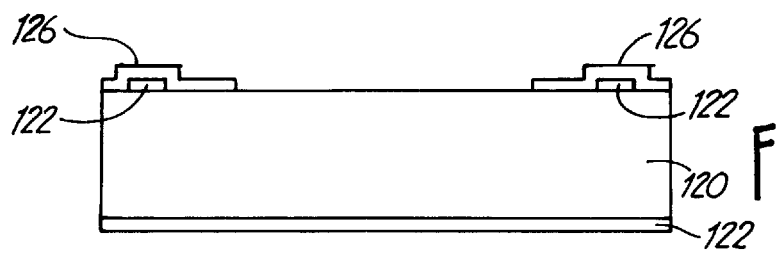
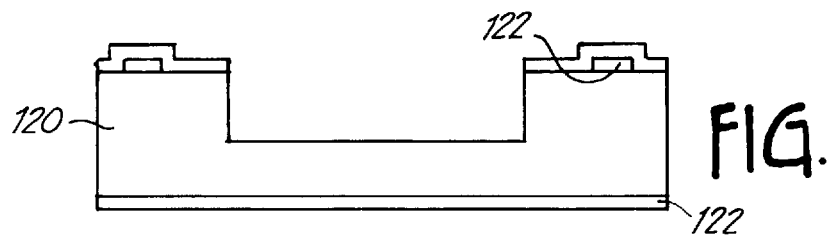
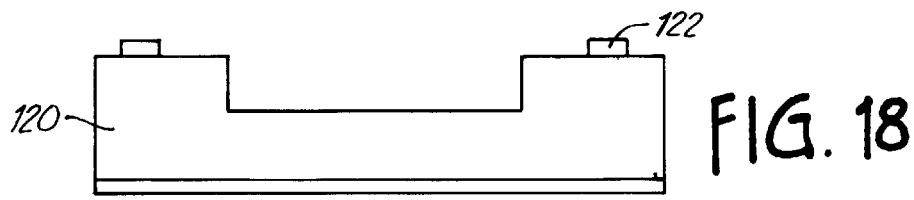
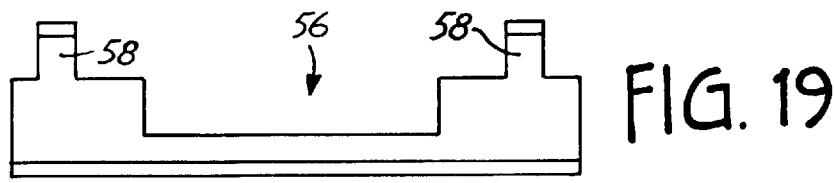

STRUCTURE AND FABRICATION PROCESS FOR INTEGRATED MOVING-COIL MAGNETIC MICRO-ACTUATOR

CROSS-REFERENCE TO RELATED APPLICATION(S)

This application claims priority from Provisional Application No. 60/170,842 filed Dec. 14, 1999 for "Structure and Fabrication Process For Integrated Moving-Coil Magnetic Micro-Actuator" by Roger Lee Hipwell, Jr., Lee Walter, Wayne Allen Bonin, Barry Dean Wissman, and Zine-Eddine Boutaghou.

BACKGROUND OF THE INVENTION

The present invention relates to a disc drive microactuator system, and more particularly to an improved structure and fabrication process for integrated moving-coil magnetic microactuators.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a slider (which carries the head) on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One particular design for high resolution head positioning involves employing a high resolution microactuator in addition to the conventional lower resolution actuator motor, thereby effecting head positioning through dual stage actuation. Various microactuator designs have been considered to accomplish high resolution head positioning. In particular, moving-coil magnetic micro-actuator designs featuring a magnet/keeper assembly and coil have been developed. Magnetic microactuators typically include a stator portion and a rotor portion, the stator being attached to the flexure and the rotor supporting the slider. The rotor is movable with respect to the stator such that the slider can be positioned more precisely over a track of a disc.

To accomplish this fine positioning, a magnetic circuit allows the rotor to be moved in response to a current provided to the magnetic circuit. The magnetic circuit comprises a bottom keeper, magnets, a conductive coil, and a top keeper, all vertically arranged. Present magnetic microactuators have the magnets positioned on the rotor, with the coil positioned above the rotor on a flexure. Stand-offs built on the rotor space the coil and flexure above the rotor. Currently, fabricating these types of circuits requires multi-layer processing involving a variety of alternative technologies, such as electroplating, high aspect ratio plating molds of epoxy based photo resist, as well as an extensive process flow to fabricate and integrate the magnet/keeper and coil assembly.

In addition, electrical connections from the stator to the rotor are required, either to connect to the coil or to other electrical elements, such as the read/write head. Often, these connections are in the form of traces or thin wires, which greatly increases the stiffness of the microactuator. As a result, the force the microactuator must generate to overcome the stiffness caused by such wires also increases. In addition, the wires may eventually fatigue or wear so that the read/write head begins to be held at an angle rather than held in the correct horizontal plane, which affects the flying height and stability of the slider and read/write head.

There are also several challenges in forming the coil used by the microactuators. A dense coil is desirable because the denser the coil, the higher the ability of the microactuator to move the read/write head. Current manufacturing techniques limit the density at which a coil can be created. These current manufacturing techniques typically involve depositing some sort of mold on the surface of a wafer and filling the mold with a metal, such as copper, to create the coil. However, such molding techniques are limited in their ability to achieve densely packed coils.

Thus, there is a need in the art for a microactuator having a highly dense coil which can be manufactured in bulk. In addition, it is desirable to reduce the stiffness of the beams while still allowing connections to be made as necessary.

BRIEF SUMMARY OF THE INVENTION

The present invention is a magnetic microactuator for use in a disc drive. The magnetic microactuator comprises a stator and a rotor (which is movable with respect to the stator). A slider carrying the read/write head is attached to the microactuator rotor so that the slider can be finely positioned above a track on a disc by causing the rotor to move.

A magnetic circuit is used to actuate the microactuator. The magnetic circuit includes a bottom ferromagnetic keeper, a conductive coil, a plurality of magnets, and a top ferromagnetic keeper, all of which are vertically arranged in parallel horizontal planes. In response to circulation of a current through the conductive coil, the magnetic circuit causes movement of the microactuator rotor in a horizontal plane generally parallel to the surface of the disc.

The microactuator utilize embedded metal interconnects for the electrical connections and coil and incorporates a dual silicon wafer structure. The embedded interconnects and coil, as well as the structure of the microactuator, are formed using a variety of thin film technologies, such as deep-trench reactive ion etching (DT-RIE), reactive ion etching (RIE), plasma-enhanced chemical vapor deposition (PCVD), and metallo-organic chemical vapor deposition (MOCVD).

The dual silicon wafer structure includes a bottom structure and a top structure which, when joined together, form the microactuator. The bottom structure comprises the stator and rotor, as well as an embedded metal coil, bond pads, and jumper. As a result of embedding the metal coil, bond pads, and jumper into the silicon from which the bottom structure is formed, the surface of the bottom structure remains planar. Maintaining a planar surface on the bottom structure greatly simplifies the manufacturing processes involved in forming the extremely fine structural components of the bottom structure.

The top structure comprises an etched tub to provide a pocket for inserting keeper material and magnets. The top structure is also etched to form mechanical stand-offs to establish the separation distance between the magnets inserted into the top structure and the coil embedded on the rotor on the bottom the structure.

Once formed, the top and bottom structures are bonded together. Formation of the top and bottom structures can take place at the wafer level, wherein several structures are formed on a silicon wafer. If formed at wafer level, device singularization is performed after a wafer-level bonding process, using well known methods, such as break away tethers.

BRIEF DESCRIPTION OF THE DRAWINGS

FIGS. 15–19 are sectional views of the top keeper/magnet structure taken along line B—B of FIG. 3 illustrating various stages of the process flow.

DETAILED DESCRIPTION

Figure 1:
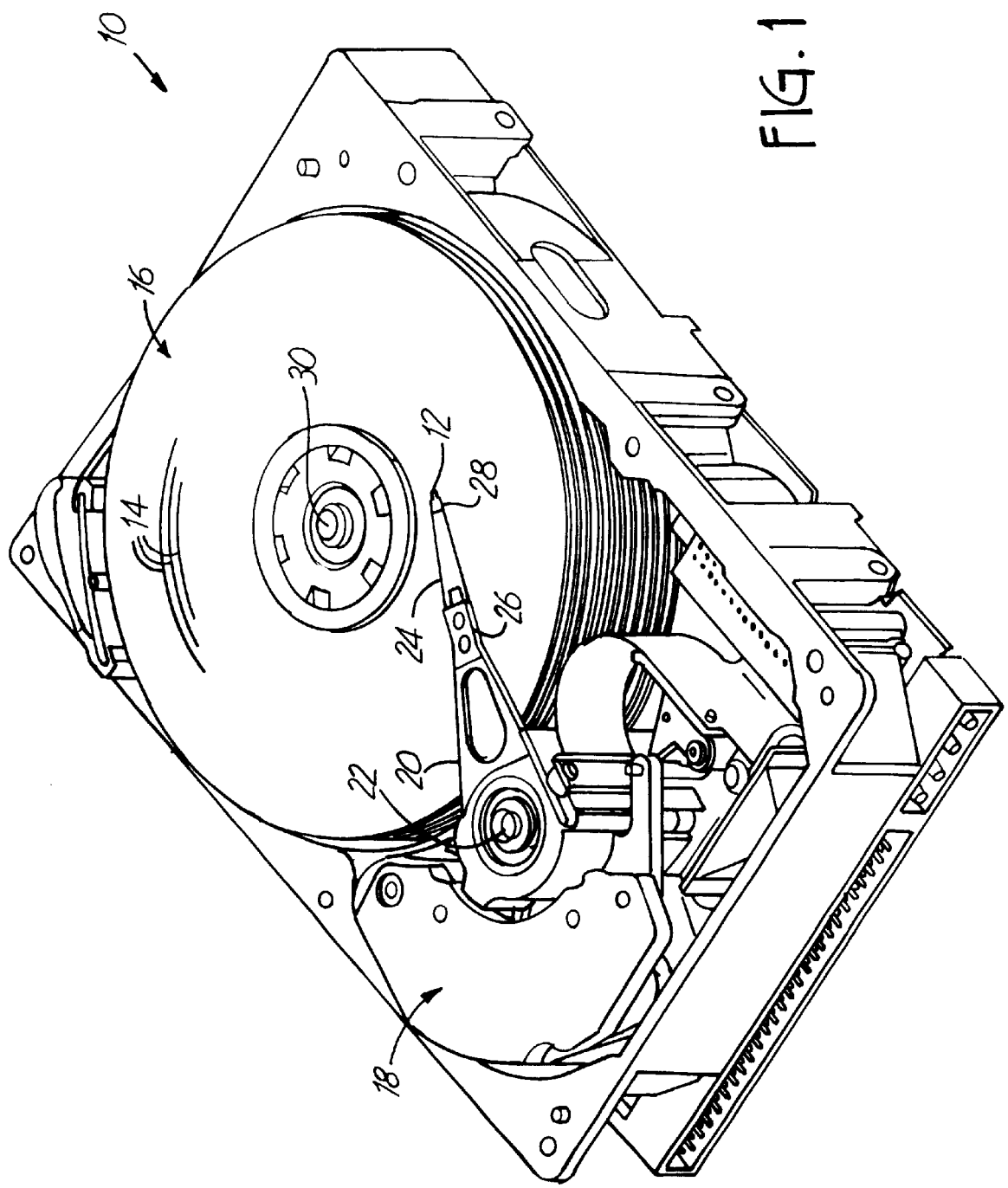
FIG. 1 is a perspective view of a disc drive actuation system for positioning a slider over tracks of a disc.

FIG. 1 is a perspective view of a disc drive actuation system 10 for positioning slider 12 over track 14 of disc 16. Actuation system 10 includes voice coil motor (VCM) 18 arranged to rotate actuator arm 20 on a spindle around axis 22. Head suspension 24 is connected to actuator arm 20 at head mounting block 26. Flexure 28 is connected to an end of head suspension 24, and carries slider 12. Slider 12 carries a transducing head (not shown in FIG. 1) for reading and/or writing data on concentric tracks 14 of disc 16. Disc 16 rotates around axis 30, so that windage is encountered by slider 12 to keep it aloft a small distance above the surface of disc 16.

VCM 18 is selectively operated to move actuator arm 20 about axis 22, thereby moving slider 12 between tracks 14 of disc 16. However, for disc drive systems with high track density, VCM 18 lacks sufficient resolution and frequency response to position a transducing head on slider 12 precisely over a selected track 14 of disc 16. Therefore, a higher resolution actuation device is necessary.

Figure 2:
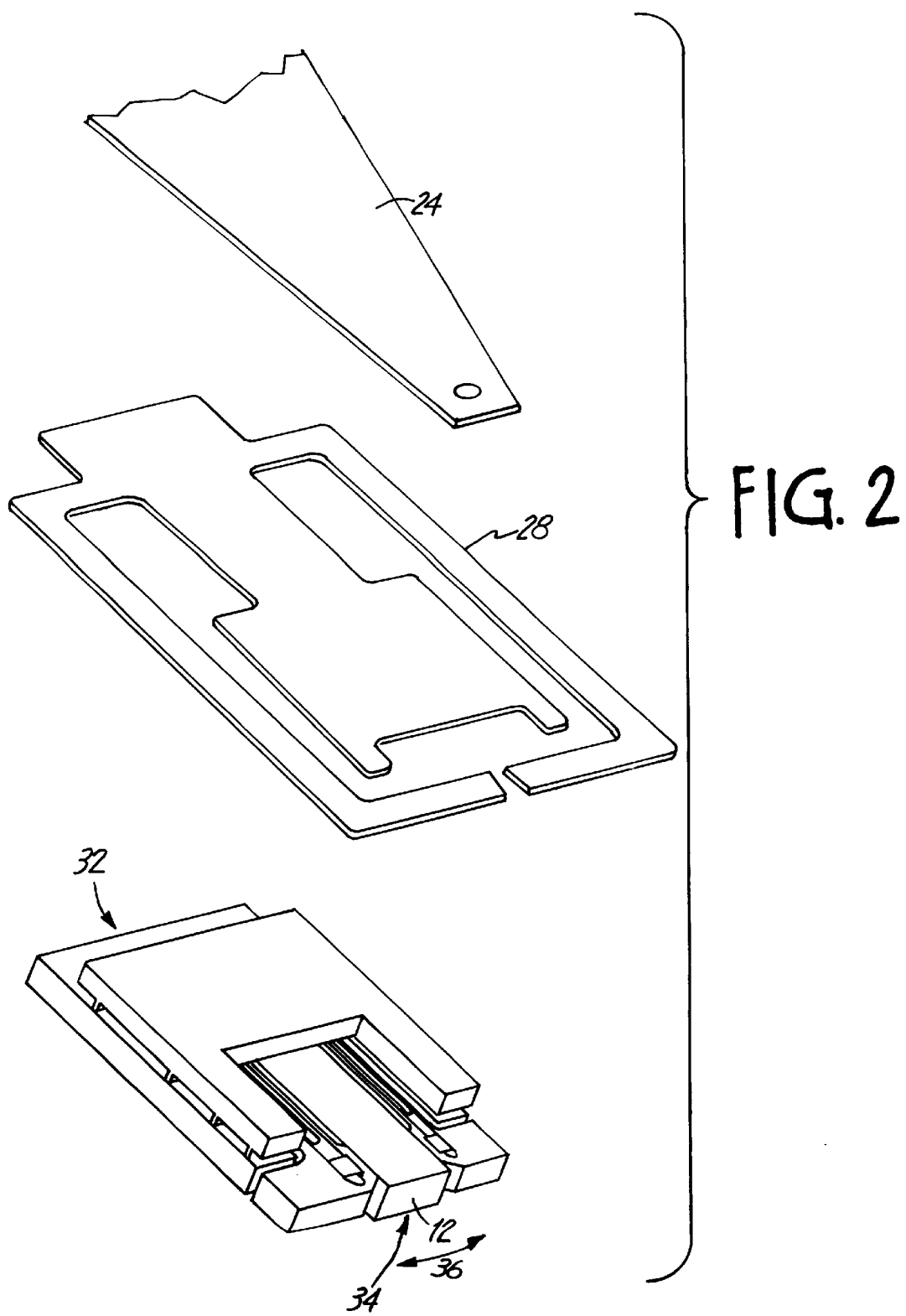
FIG. 2 is an exploded perspective view of a portion of a disc drive including a microactuator according to the present invention.

FIG. 2 is an exploded perspective view of a portion of a disc drive including microactuator 32 for high resolution head positioning. Flexure 28 is attached to load beam 24, and microactuator 32 is attached to flexure 28. Microactuator 32 carries slider 12 above a surface of disc. Transducing head 34 is carried by slider 12 to write and read data to and from the disc.

In operation, load beam 24, flexure 28, and microactuator 32 carrying slider 12 are all moved together as coarse positioning is performed by VCM 18 (FIG. 1) as it moves actuator arm 20 (FIG. 1). To achieve fine positioning of transducing head 34, microactuator 32 generates a force which causes bending of beam springs located on the microactuator. As a result, the portion of microactuator 32 carrying slider 12 moves slightly with respect to flexure 28 in the direction of arrows 36, displacing transducing head 34 with high resolution for precise positioning of the transducing head 34 over a selected track of the disc.

Figure 3:
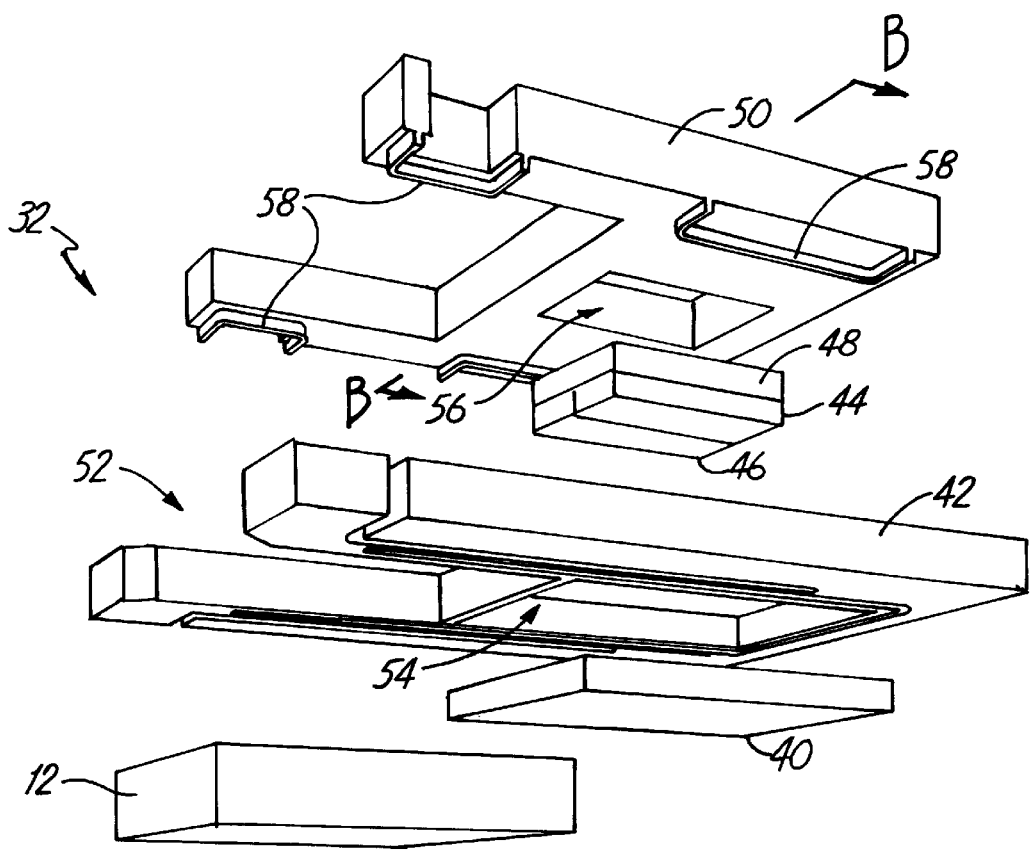
FIG. 3 is an exploded perspective view of a microactuator system for positioning a slider over tracks of a disc.

FIG. 3 is an exploded perspective view of the microactuator 32 together with the slider 12. The microactuator 32 comprises, bottom keeper 40, bottom structure 42, magnets 44, 46, top keeper 48, and top structure 50. The bottom structure 42 has an aperture 52 into which the slider 12 is positioned. Bottom structure 42 likewise has a bottom keeper tub 54 for receiving the bottom keeper 40. The top structure 50 similarly has a tub 56 for receiving the top keeper 48 and magnets 44, 46. Also on top structure 50 are mechanical stand-offs 58.

Figure 4:
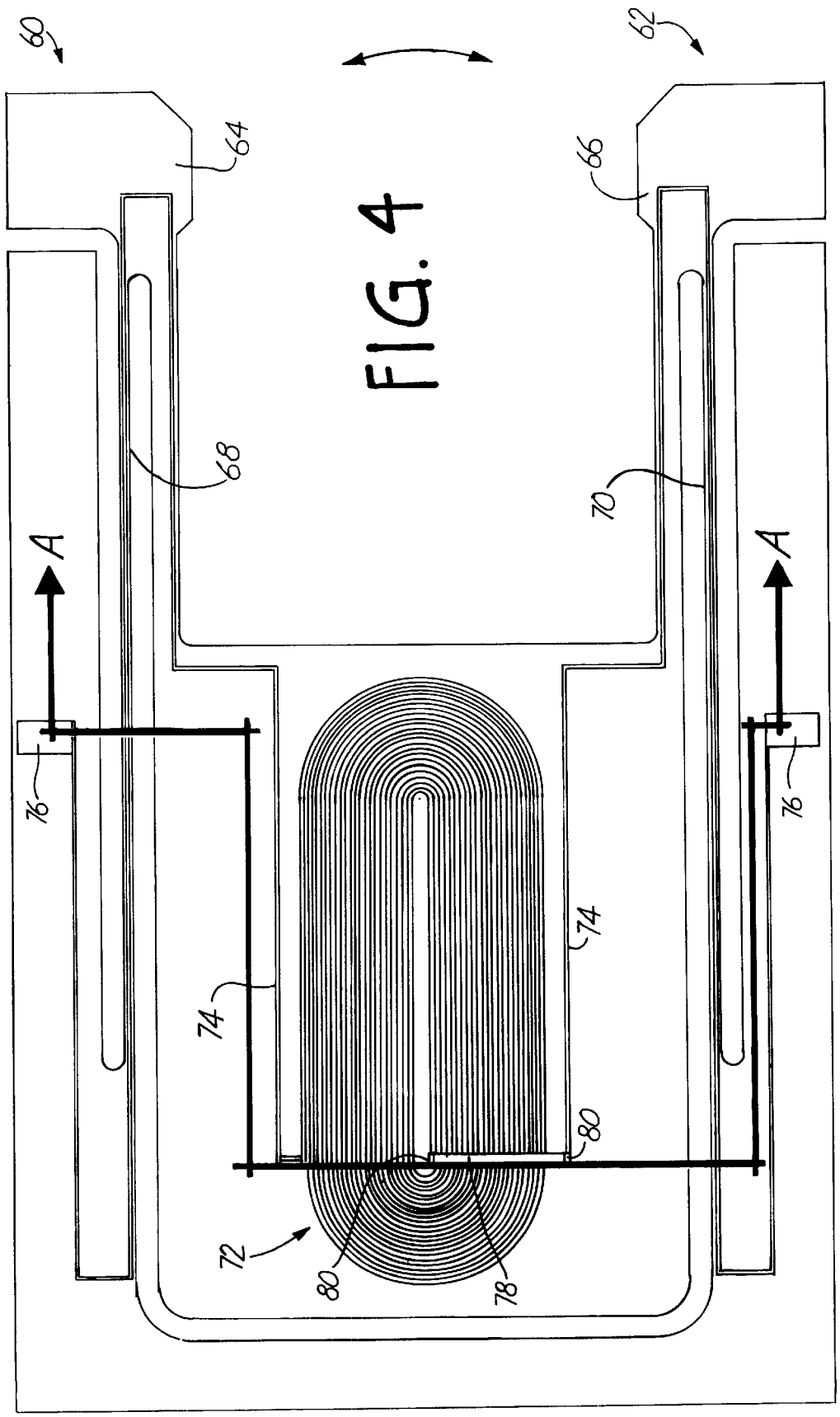
FIG. 4 is a top plan view of the bottom structure of the microactuator.

FIG. 4 is a top plan view of bottom structure 42 shown without a slider. Bottom structure 42 comprises outer bars 60 and 62 and inner alignment clips 64 and 66. Inner alignment clips 64 and 66 function to clamp against the sides of a slider to hold the slider in bottom structure 42. Flexible beam springs 68 and 70 extend along bars 60 and 62. Embedded in the top surface of bottom structure 42 is coil 72. Also embedded in bottom structure 42 are embedded wires 74, bond pads 76, and jumper 78. The embedded wires 74 start at coil 72 and run along the flexible beams 68, 70 to bond pads 76 on the bars 60, 62. Located at coil 72 is jumper 78 and vias 80. The microactuator is actuated by circulating a current through the winding of coil 72. Bond pads 76 provide an enlarged area to which electrical circuitry can be connected so that current can be applied to the coil 72. Embedded wires 74 conduct the current to the coil 72, and jumper 78 creates an electrical connection from the center of the coil 72 to the outer edge of the coil 72.

The outer preloading bars 60, 62 comprise a stator, while the flexible beams 68, 70, inner alignment clips 64, 66, and the portion of the bottom structure 42 on which the coil 72 is located comprise a rotor. When a slider is carried in the bottom structure 42, the flexible beams 68, 70 allow the slider to be moved in a horizontal plane as indicated by arrows 36. A magnetic circuit used to actuate the microactuator and thus finely position the slider. Referring back to FIGS. 2 and 3, when assembled, the magnets 44, 46 and top keeper 48 of the top structure 50 are located above the coil 72 on the bottom structure 42. The mechanical stand-offs 58 create an air space between the magnets 44, 46 of the top structure 50 and the coil 72 on the bottom structure 42.

A vertical magnetic circuit is formed by the bottom keeper 40, the magnets 44, 46, the coil windings 72, the embedded wires 74, and upper keeper 48. When a current is applied to the coil windings 72, the current interacts with a magnetic field in the air gap between the magnets 44, 46 in the top structure 50 and the coil 72 on the bottom structure 42 so that magnetic flux flows in the air gap. This interaction causes a force to be asserted on the rotor in a lateral direction (across the tracks of the disc). This force is controllable to achieve high resolution movement for fine positioning of the microactuator rotor with respect to the tracks of the disc. Top and bottom keepers 48, 40 prevent the magnetic field from interfering with the disc or other circuitry located near the microactuator.

As described above, there are many challenges in manufacturing magnetic microactuators. The present invention solves many of these problems by disclosing a structure and fabrication process flow for an integrated moving-coil magnetic microactuator by using a dual silicon wafer process and utilizing standard thin film technologies and a novel MOCVD application. The process flow includes steps for creating a densely packed high aspect ratio coil embedded in the bottom structure. Also embedded in the bottom structure are the connecting wires and bond pads to provide current to the coil.

Bottom structures are formed from one wafer, while the top structures are formed from another wafer. Thus, a wafer level bonding process can be used to create the microactuators by bonding the top wafer to the bottom wafer. As a result, the process provides a simplified post fabrication assembly strategy compared to those previously available.

In general, the bottom structure is formed by creating the embedded coil, wires, bond pads, and jumper in a silicon wafer. The silicon wafer is then etched to form a keeper tub for receiving the keeper. Finally, the structural etches are performed to form the rotor and stator structures, including the flexible spring beams, arms, and tabs. Similarly, the top structure is formed by etching a keeper/magnet tub and the mechanical stand-offs in a silicon wafer.

Figure 5:
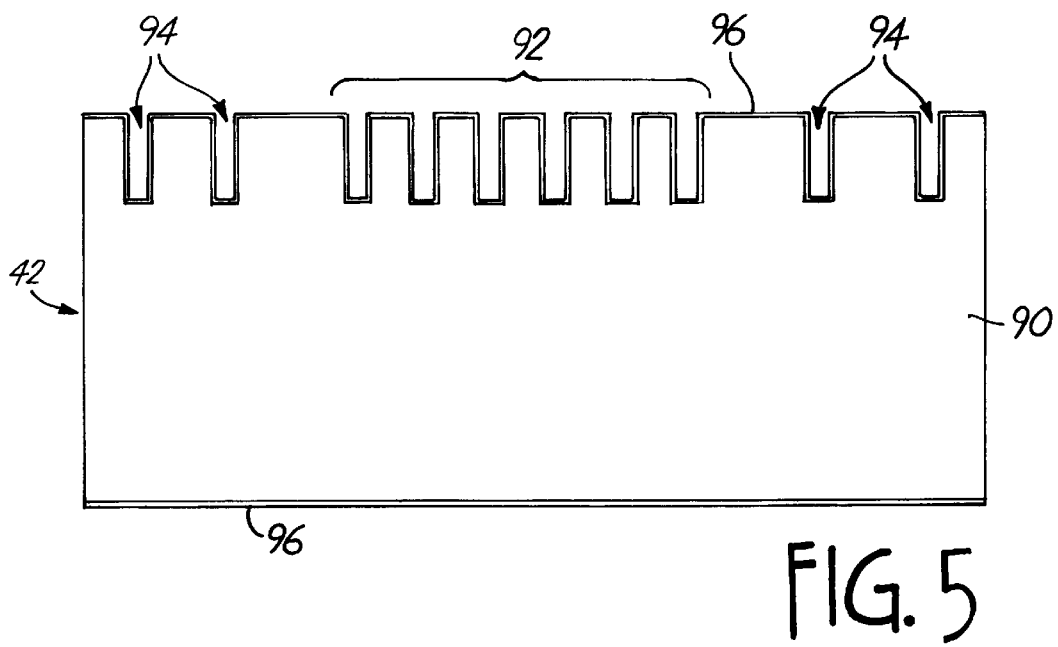
FIGS. 5–14 are sectional views of the bottom structure taken along line A—A of FIG. 4 illustrating various stages of the process flow.

FIGS. 5 through 12 are sectional views of a bottom structure, all taken along line A—A of FIG. 4, showing various stages of the fabrication process flow for forming a bottom structure. FIG. 5 illustrates the beginning of the process flow and shows a bottom structure 42 formed of a silicon wafer 90. The silicon wafer 90 is etched to form trenches 92 which will become the coil. Also visible are etched trenches 94 which will become the embedded wires. For simplicity of illustration, the number of trenches 92 is limited to six, though the coil may in actuality have many more windings.

The pattern of coil trenches 92 and embedded wire trenches 94 is created using a photo resist or oxide mask. The pattern created by this mask allows for the trenches to be etched using deep trench reactive ion etching (DT-RIE). DT-RIE is desirable because it can achieve a high aspect ratio (height to width) etch, such as 10 to 1 or 20 to 1. Thus, the coil and embedded wire trenches 92, 94 can be formed so that they are approximately 25 microns deep but only 5 microns wide.

Once the etching of the trenches 92, 94 is completed, the photo resist mask is stripped. Next, a thermal oxide layer 96 is grown on the wafer 90 by placing the wafer in a high temperature oxidation furnace. The thermal oxide layer 96 is formed on all surfaces of the wafer 90, including in the surfaces of the trenches 92, 94. The thermal oxide layer 96 acts as a dielectric and will serve to electrically isolate the coil and embedded wires once they are formed.

Figure 6:
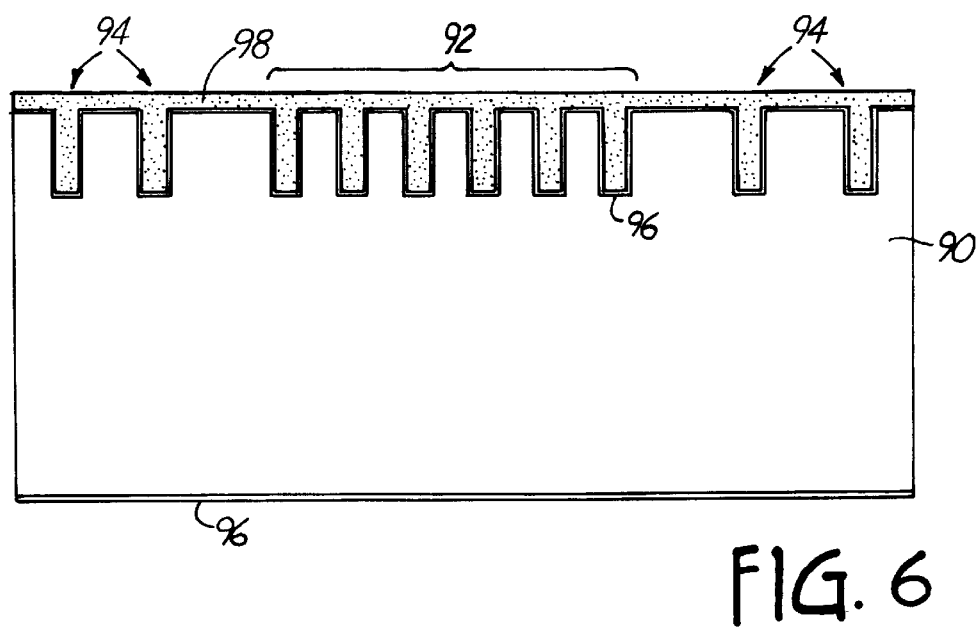

FIG. 6 is a sectional view of the bottom structure showing the next step in the process flow. Visible in FIG. 6 are the coil trenches 92 and embedded wire trenches 94 coated with the thermal oxide layer 96. Also visible in FIG. 6 is a metal layer 98 which has been conformally deposited using metalloorganic chemical vapor deposition (MOCVD). The MOCVD process involves first applying a seed layer of a material such as $TiN_x$, TaN, TaSiN, or WN. This seed layer need only be a few tenths or hundredths of Angstroms thick. For purposes of simplicity, the seed layer is not shown in FIG. 6. After the seed layer is applied, the desired metal is deposited on the seed layer. Suitable metals include copper, aluminum, gold, nickel, titanium, palladium, platinum, tantalum, or tungsten. Deposition of the seed layer and the metal can occur in an in situ tandem process. The MOCVD technique is particularly suited for the present invention in that such a process results in extremely conformal deposition of the desired metal in the trenches 92, 94.

Figure 7:
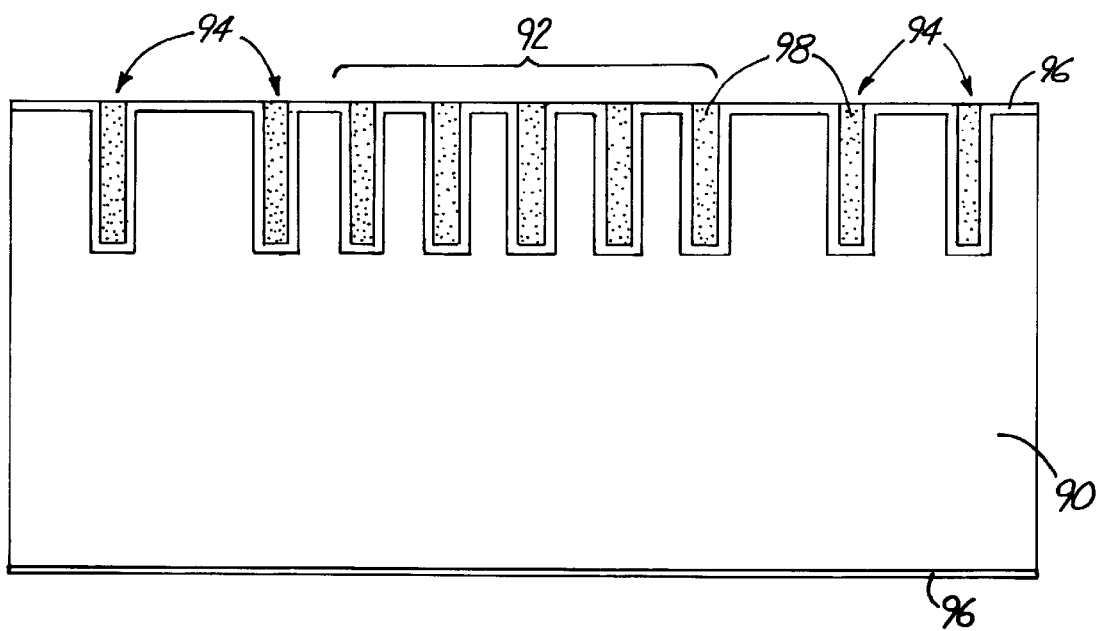

As shown in FIG. 7, once the desired metal has been deposited, any remaining surface material can be removed using a chemical mechanical planarization technique. Any residual slurry is cleaned off the wafer 90 using a post chemical mechanical planarization cleaning system. The result is that the metal layer 98 now remains only in the trenches 92, 94, thus forming a densely packed coil 72 and embedded wires 74 with a dielectric layer 96. Furthermore, after cleaning, the wafer 90 once again has a planar surface. The flat surface of wafer 90 is beneficial in later stages of the process flow involving patterning and etching of the structural features of the microactuator.

Figure 8:
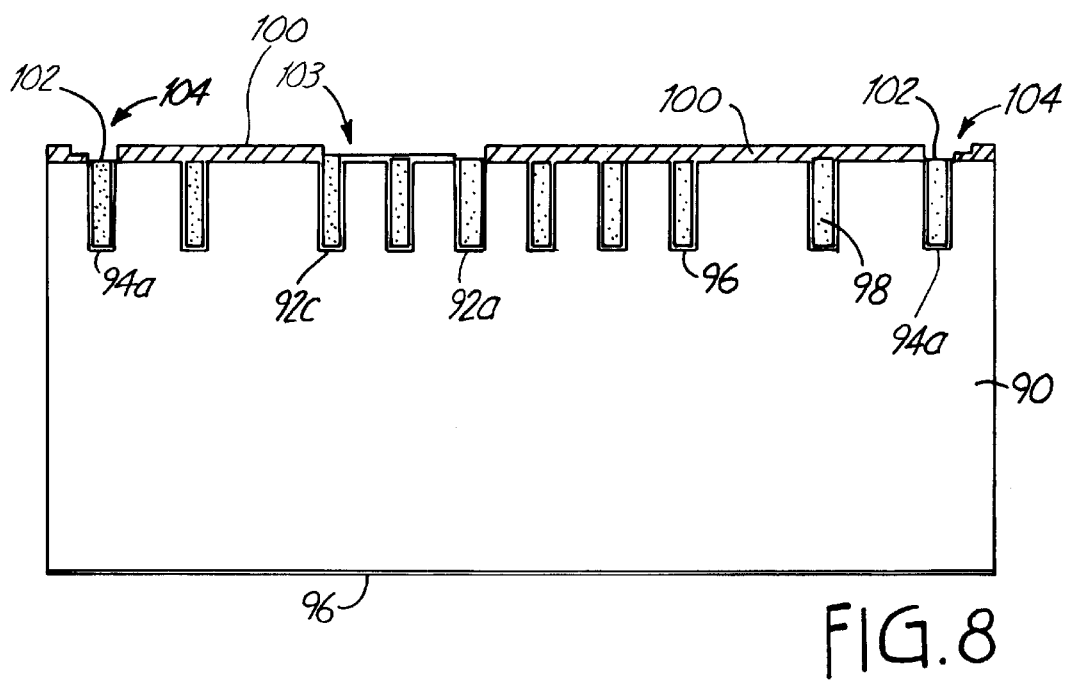
Figure 9:
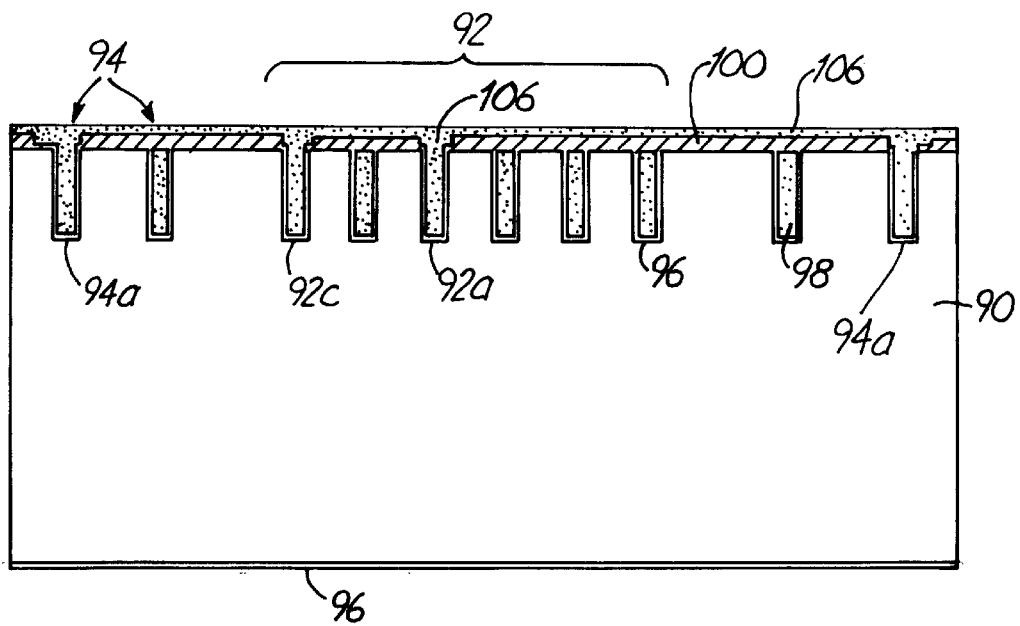
Figure 10:
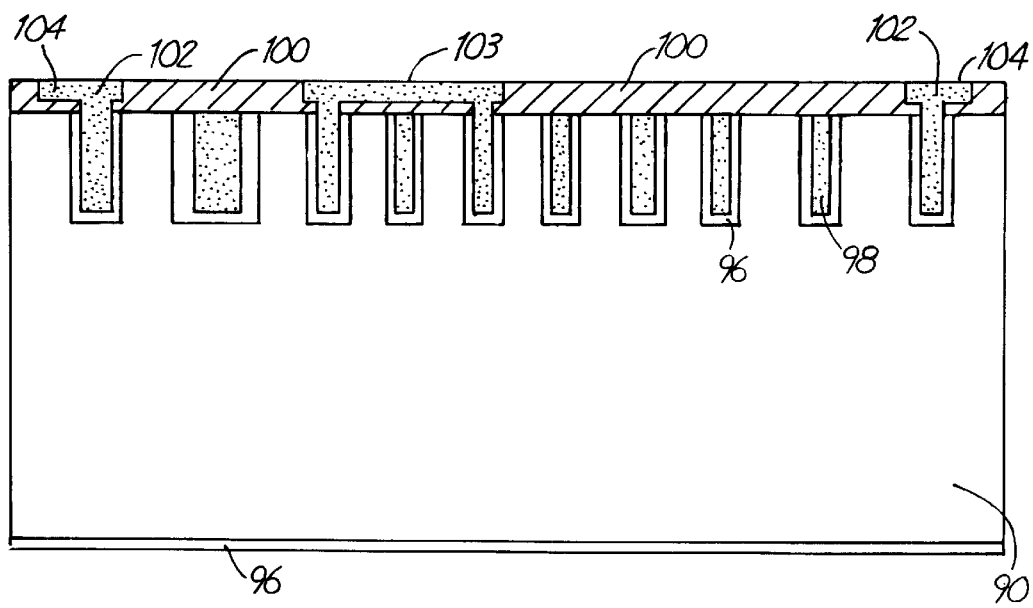

After forming the embedded wires and coil, the bond pads 76 and jumper 78 must be formed. FIGS. 8 through 10 illustrate the process flow for forming the bond pads 76 and jumper 78, starting with depositing a layer of silicon dioxide 100 on the surface of the wafer 90 as shown in FIG. 8. The silicon dioxide layer 100 may be deposited using plasma enhanced chemical vapor deposition (PECVD) and covers the entire surface of the wafer 90, including the trenches 92, 94 filled with metal layer 98.

To provide electrical connection to the metal layer 98, some of the silicon dioxide layer 100 must be removed to create vias 102 to selected trenches 92, 94. The electrical connect vias 102 are patterned and etched through the silicon dioxide layer 100 to the metal 98 at the center trench 92a and an outer trench 92c of the coil and at the outer embedded wire trenches 94a. In addition, a second etch is performed on the silicon dioxide layer 100 to define the jumper 103 and bond pad 104 areas. Unlike the vias 102, the jumper 103 and bond pad 104 etches do not remove all the silicon dioxide layer 100. Rather, the jumper 103 connects two vias 102 at the outer trenches 92 of the coil, while leaving a layer of oxide 100 over the remaining coil windings to provide insulation. Similarly, the bond pad areas 104 do not extend completely through the silicon dioxide layer 100, though a via 102 is located at the bond pad area 104 to allow an electrical connection to the metal layer 98 in the trenches 94.

FIG. 9 shows a second metal layer 106 which has been deposited on the patterned and etched silicon dioxide layer 100. One method of depositing the metal layer 106 is to use a TaN seed layer which is conformally deposited using MOCVD. Once the seed layer is applied, a metal, such as copper, can be conformally deposited using MOCVD. The metal layer 106 is deposited in the vias 102, as well as at the jumper 103 and bond pad areas 104. Thus, the second metal layer 106 is in contact with the first metal layer 98 at the vias 102, creating the necessary electrical connections to the embedded coil and wires at the bond pads and jumper.

As seen in FIG. 10, after the copper layer 106 is deposited, any residue surface copper is removed using chemical mechanical planarization and the residual slurry is cleaned off the surface with a post chemical mechanical planarization cleaning system. Chemical mechanical planarization is particularly suited for cleaning off the extra copper of the metallic layer 106 because there is good selectivity between the copper 106 and the oxide layer 100 on the silicon wafer 90. Thus, the copper 106 is easily removed, while the oxide layer 100 is not, which results in the ability to finish the wafer 90 to an extremely flat and planar surface.

Figure 11:
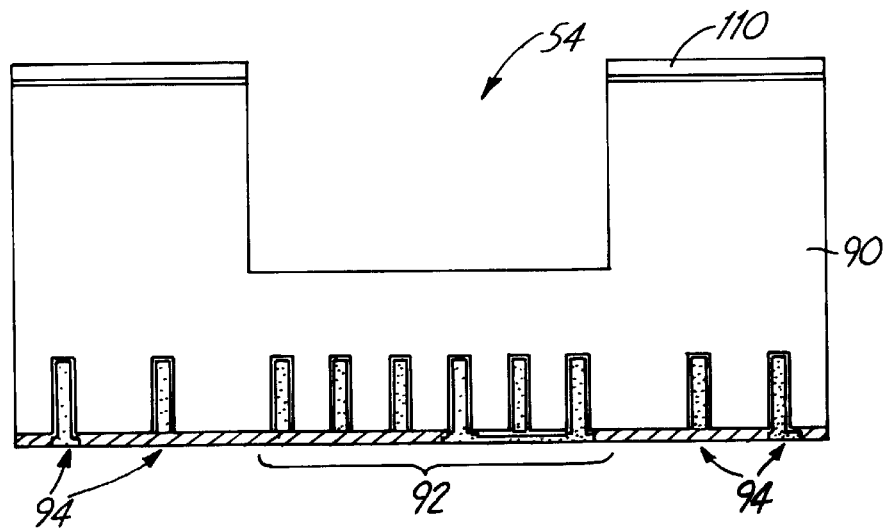

In FIG. 11, the wafer 90 has been inverted so that the coil 92 and embedded wires 94 are now on the bottom of the wafer as viewed in FIG. 11. FIG. 11 shows the point in the process flow where the bottom keeper tub 54 is etched in wafer 90. The keeper tub 54 may be etched by first applying a resist mask 110 to delineate the tub 54 and using either a reactive ion etching or DT-RIE processes. Preferably, the tub 54 should be etched so that when a keeper is placed in the tub 54, the keeper is located close to the coil to control the magnetic field. Once the tub 54 has been formed, the resist mask 110 is stripped.

Figure 12:
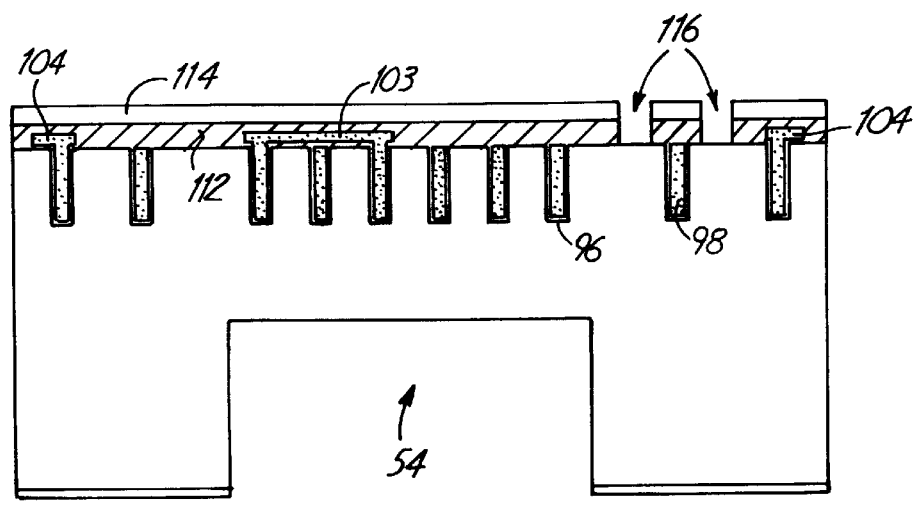
Figure 13:
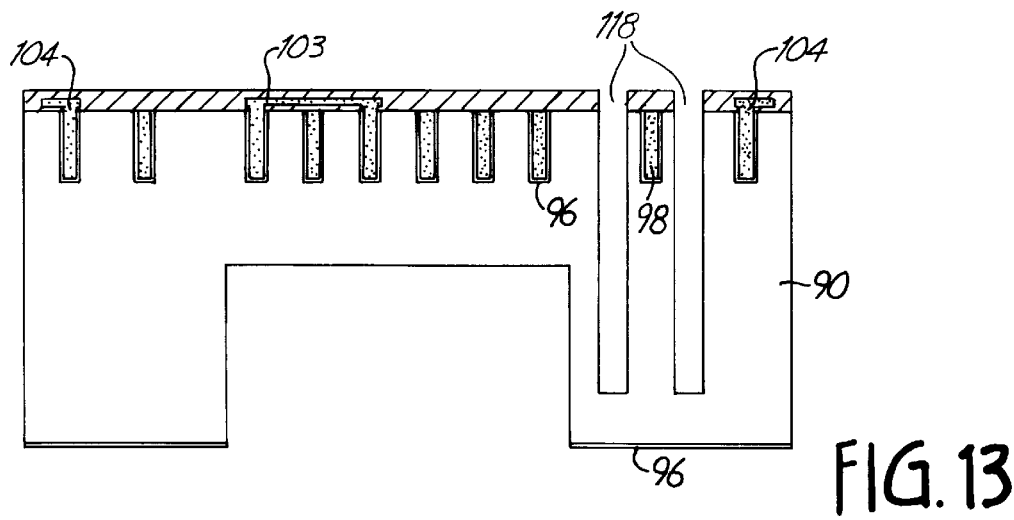
Figure 14:
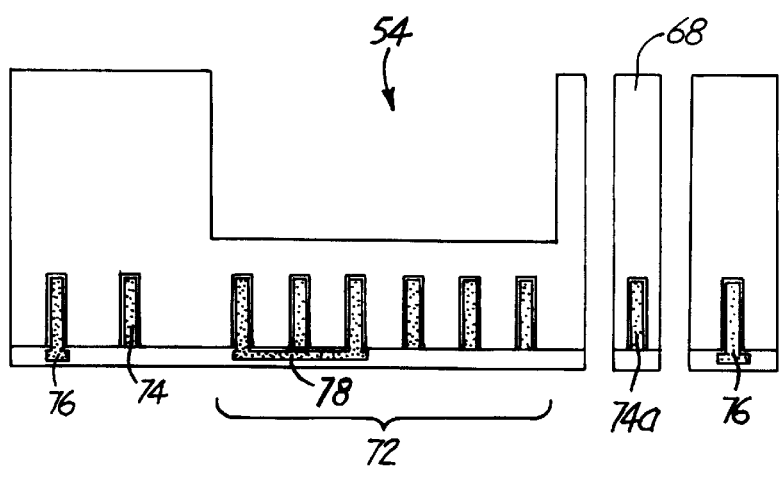

FIGS. 12 through 14 illustrate the remaining process flow relating to formation of the structure of the bottom structure, such as the beams, and the rotor and stator. Forming the structural features involves complicated and intricate etchings. As mentioned above, the surface of the wafer 90 remains flat and planar, even after formation of the embedded coil and wires, bond pads, and jumper. Because the wafer 90 has a flat surface, the complicated structural etches can be done using photolithography to form the etching patterns and DT-RIE or reactive ion etching to etch the structures. The masking and etching process allows for precise control over the formation of the etches. In contrast, forming the structural features of the microactuator is much more complex when the coil, wires, or jumper and bond pads are built up on the surface of the wafer 90. When the coil or wires are built up on the surface of the wafer 90, the wafer 90 has an uneven surface which greatly hampers a photolithography and etching processes.

In FIG. 12, the wafer 90 is returned to its first position by once again inverting the wafer 90 so that the coil 92 and embedded wires 94 are again on the top of the wafer 90 as viewed in FIG. 12. Because the structural etches used to form the rotor, stator, and beams require much deeper etching, the etch process may involve an oxide layer 112 in addition to a photoresist pattern 114. The etch pattern can be transferred from the photoresist 114 to the oxide 112, and the photoresist 114 can either be stripped off the wafer or left on. Thus, an oxide mask 112 protects the areas not to be etched and makes such areas much more resistant to the etching than if the pattern was made of photoresist 114 only. This combination of the oxide mask 112 and photoresist pattern 114 allows an extremely deep trench etch to be performed.

The pattern created by the oxide 112 and photoresist 114 creates two areas 116 where the wafer 90 will be etched to form the beams. FIG. 13 illustrates the wafer 90 after the etching process. During the etching process, the oxide layer 112 is removed. In addition, two trenches 118 are formed in the wafer 90. In performing the etch, the silicon is not etched entirely through the width of the wafer 90. Rather, a small amount of silicon remains at the bottom of the trenches 118 to maintain backside cooling of the wafer 90.

In FIG. 14, the wafer 90 is once again inverted. FIG. 14 shows the final step of blanket thinning the top of the wafer 90 (as viewed in FIG. 14) using a reactive ion etch. Once this performed, the individual structures can be separated from the wafer 90 using, for instance, break away tethers. The result is a bottom structure having a bottom keeper tub 54 etched on one surface, with an embedded coil 72 on the other surface. The bottom structure also now has embedded wires 74 and bond pads 76. A jumper 78 connects the inner coil winding to the outer coil winding. Also visible is a flexible beam spring 68 with an embedded wire 74a.

The formation of the top magnet/keeper structure similarly involves a variety of etching processes. FIGS. 15 through 19 are cross sectional views of the top structure taken along line B—B of FIG. 3. FIG. 15 shows a top structure 50 formed of a wafer 120 which will be etched to form a top structure having a tub 56 and mechanical stand-offs 58. The tub 56 may be sized to accept only magnets, or may be sized to accept both magnets and a keeper. In forming the top structure, the wafer 120 may be made of silicon, or some other suitable material, or may be made entirely of keeper material. If the wafer is made of silicon, the tub 56 is etched to allow insertion of both magnets and a keeper. If the wafer is made of a keeper material, the tub 56 need only be sized to fit the magnets.

The wafer 120 has a silicon dioxide layer 122 applied to both the top and bottom side of the wafer 120. The silicon dioxide layer 122 may be formed in a variety of ways, either by heating the wafer, deposition, or growing the silicon dioxide on the wafer 120. A photoresist pattern 124 is applied to the silicon dioxide layer 122, and using a reactive ion etching process, the silicon dioxide layer 122 on the top of the wafer is selectively etched to form a pattern for what will eventually become the mechanical stand-offs 58. FIG. 15 shows the wafer 120 after the RIE has occurred to remove all the silicon dioxide layer 122 from the top surface of the wafer 120 (as viewed in FIG. 15) except the silicon dioxide 122 under the photoresist 124. Though still visible in FIG. 15, once the etching is complete, the photoresist pattern 124 is stripped from the wafer 120, leaving only the silicon dioxide pattern 122 corresponding to the stand-offs 58.

In FIG. 16, a second photoresist layer 126 has been deposited on the top surface of wafer 120 to form a pattern for etching the magnet/keeper tub 56. The second photoresist layer 126 overlays the silicon dioxide pattern 122 ensuring the silicon dioxide pattern 122 remains in place during the tub 56 etching process. Next, as shown in FIG. 17, the magnet/keeper tub 56 is etched part way using DT-RIE. Then, as shown in FIG. 18, the photoresist mask 126 is removed, exposing only the underlying silicon dioxide mask 122 pattern corresponding to what will become the stand-offs 58. In the final etching process shown in FIG. 19, the stand-offs 58 are etched and the final etching for forming the tub 56 is completed.

Figure 20A:
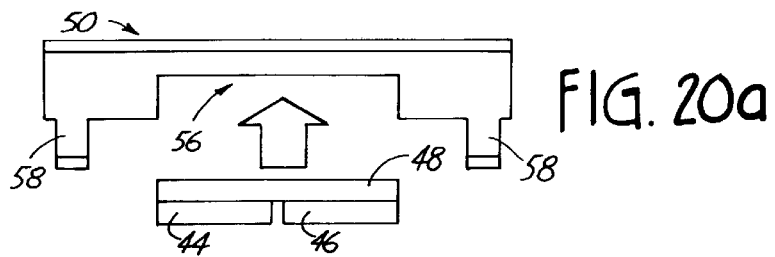
FIG. 20a is a cross sectional view of the top structure with keeper and magnets.
Figure 20B:
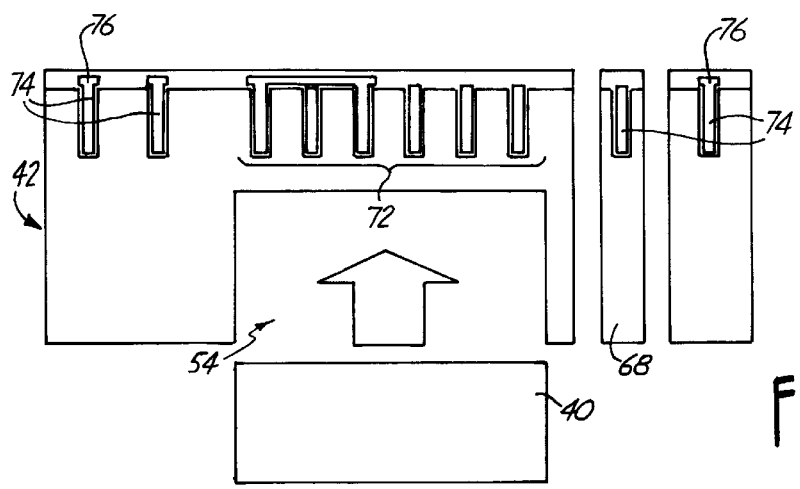
FIG. 20b is a cross sectional view of the bottom structure with bottom keeper.
Figure 20C:
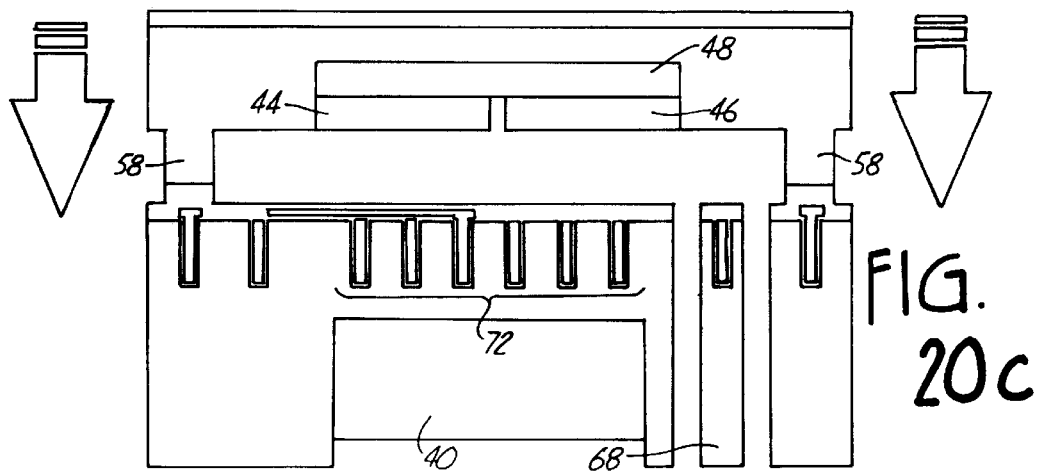
FIG. 20c is a cross sectional view of the top structure as it is bonded to the bottom structure.

FIGS. 20a–20c show the final assembly of the magnets, keepers, top wafer, and bottom wafer. FIG. 20a is a cross sectional view of the top structure 50 with tub 56, and stand-offs 58. Also shown in FIG. 20a are magnets 44, 46 and keeper 48 about to be inserted into tub 56. Once inserted, the magnets 44, 46 and keeper 56 are held in the tub 56 by bonding or adhering the magnets 44, 46 and keeper 56 to the top structure 50 using any variety of suitable methods.

FIG. 20b is a cross sectional view taken along line A—A of FIG. 4 showing the bottom keeper 40 as it is about to be inserted into the bottom structure 42. Shown embedded in the bottom structure are coil 72, embedded wires 74, bond pads 76, and jumper 78. Also visible is a flexible beam 68. Similar to the top keeper 48, the bottom keeper 40 can be bonded or adhered to the bottom structure 42 in a variety of suitable manners.

FIG. 20c shows the final step of bonding the top structure 50 to the bottom structure 42. The two structures 42, 50 can be bonded together using a method such as silicon fusion bonding, dispensed adhesive, or adhesive films. When bonded together, the stand-offs 58 on the top structure 50 are bonded to the bottom structure 50 creating the desired air gap between the coil 72 on the bottom structure 50 and the magnets 44, 46 on the top structure 50. When formed at the wafer level, it is necessary to singulate each individual device from the wafer, for instance by using break away tethers. Though discussed in terms of wafer level processing, it is also possible to assemble the microactuator using a die level process and using automated assembly robotics.

Figure 21:
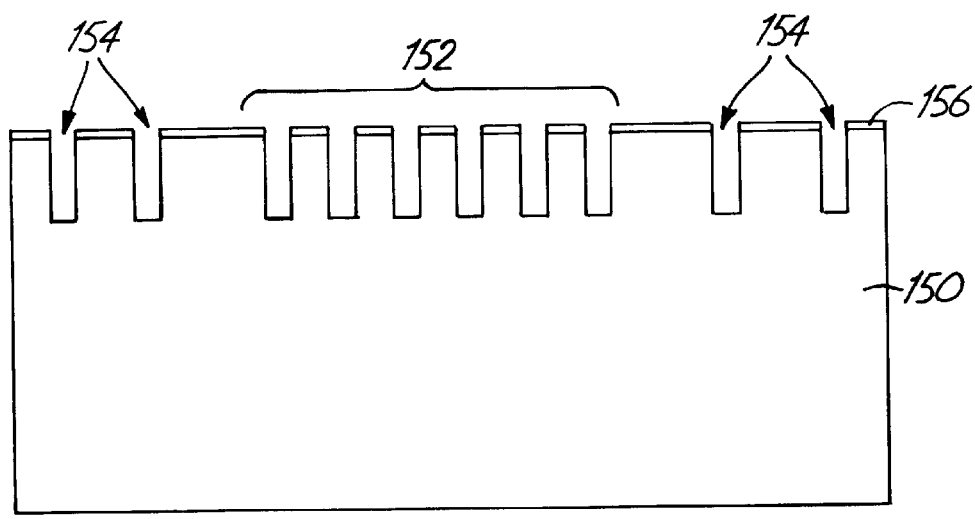
FIGS. 21–26 are cross sectional views taken along line A—A of FIG. 4 illustrating an alternate embodiment of the present invention.
Figure 22:
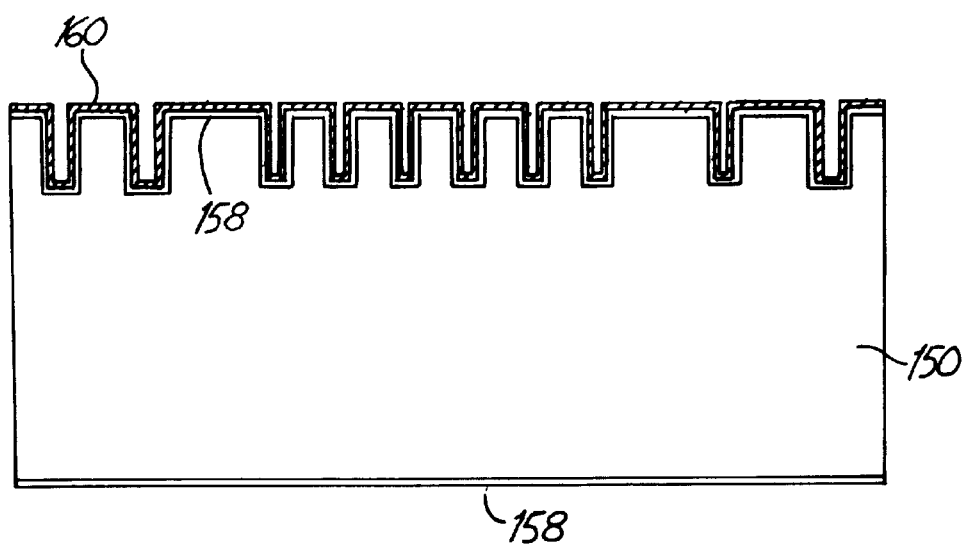

FIGS. 21 through 26 are cross sectional views of a bottom structure taken along line A—A in FIG. 4 illustrating an alternate selective deposition method for fabricating the embedded interconnects and coils on a bottom structure. In FIG. 21, a portion of a silicon wafer 150 has been etched to form embedded coil trenches 152 and embedded wire trenches 154. The etching process is accomplished by applying a photoresist/oxide mask 156 to the top surface of the wafer 150 in a manner such as that described above. Once the etching is completed, the oxide mask 156 is stripped and, as shown in FIG. 22, a conformal oxide layer 158 is grown on the surface of the wafer 150. Just as described above, the oxide layer 158 forms on all surfaces of the wafer 150, including the surfaces of the trenches 152, 154 and acts as a dielectric and helps electrically insulate the coil 152 and embedded wires 154.

On top of the oxide layer 158, a tantalum nitrite (TaN) seed layer 160 is conformally deposited using chemical vapor deposition. The TaN is deposited on the surface of the wafer 150, as well as in the trenches 152, 154 and will be used later in the process flow in connection with depositing a metal in the trenches 152, 154 to form the coil 72 and embedded wires 74.

Figure 23:
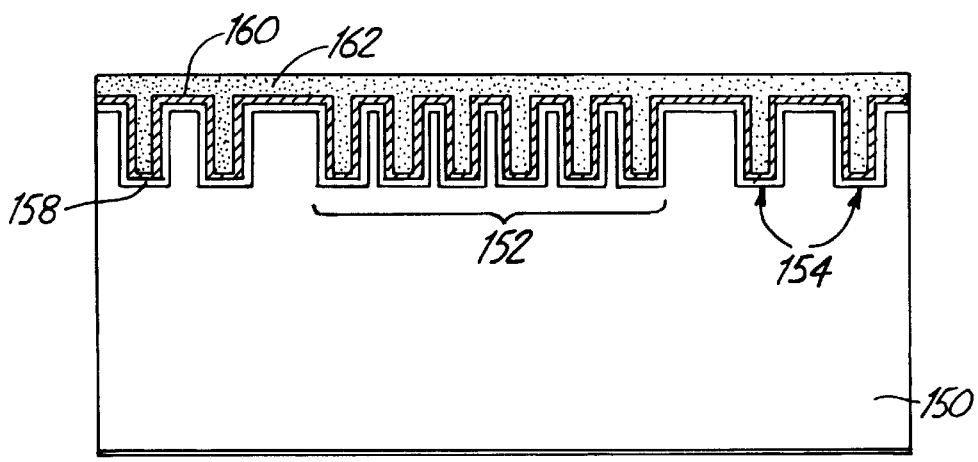

Once the seed layer 160 is deposited, a conformal polymer coating 162 is applied to the structure 150, as shown in FIG. 23. One such suitable polymer coating is Valox. The polymer coating 162 likewise deposits on the surface of the wafer 150 as well as in the trenches 152, 154.

Figure 24:
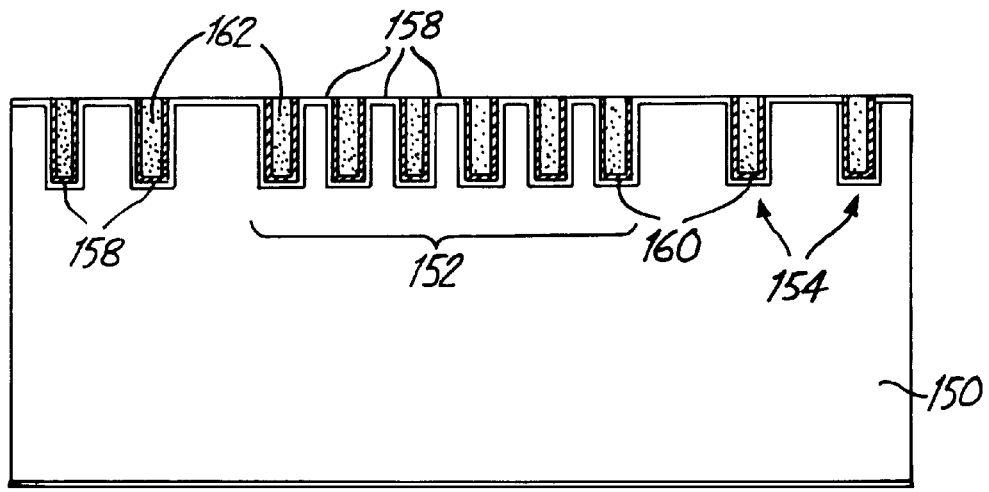

Next, in FIG. 24, the surface polymer 162 is removed from the surface of the structure 150, but not from in the trenches 152, 154. One method of removing the surface polymer 162 is by using a dioxide ($O_2$) plasma etch. In addition to removing the surface polymer 162, the now exposed TaN seed layer 160 on the surface of the structure 150 is also removed using a reactive ion etching process, however, the seed layer 160 in the trenches 152, 154 remains protected by the polymer 162. Thus, while the surface polymer 162 and seed material 160 is removed from the surface of the wafer 150, the seed layer 160 in the trenches 152, 154 remains intact, protected by the polymer coating 162.

Figure 25:
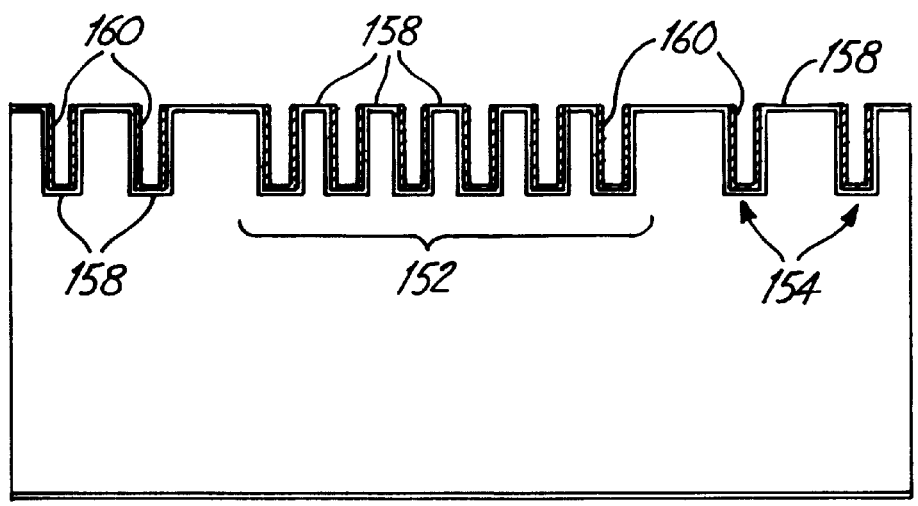
Figure 26:
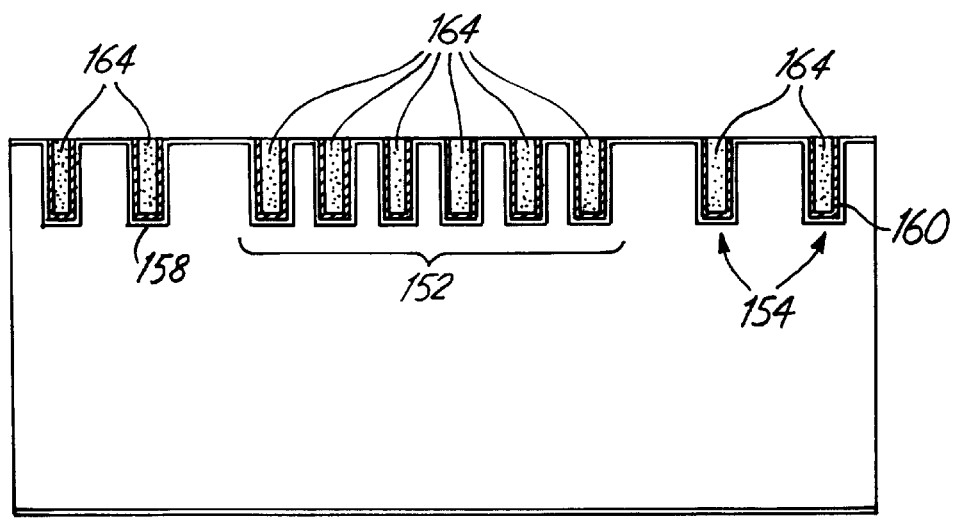

Before the metalization can be applied to form the embedded coil 72 and wires 74, the remaining polymer 162 in the trenches 152, 154 is removed, as shown in FIG. 25. The polymer 162 may once again be removed by using an $O_2$ plasma stripping method. As a result, the TaN seed layer 160 is now exposed on the side and bottom surfaces of the trenches 152, 154 so that the trenches 152, 154 are prepared to accept a metal. In FIG. 26, a metal 164, preferably copper, is deposited using MOCVD. The copper 164 deposits only at places coated with the seed layer 160. As such, the copper 164 fills each of the trenches 152, 154 of the bottom structure 150, forming the embedded coil 72 and embedded wires 74. Once again, the result is that the surface of the wafer 150 remains planar. However, unlike the previous method, the extra step of a chemical mechanical polishing to finish the surface of the structure 150 is not required.

Figure 27:
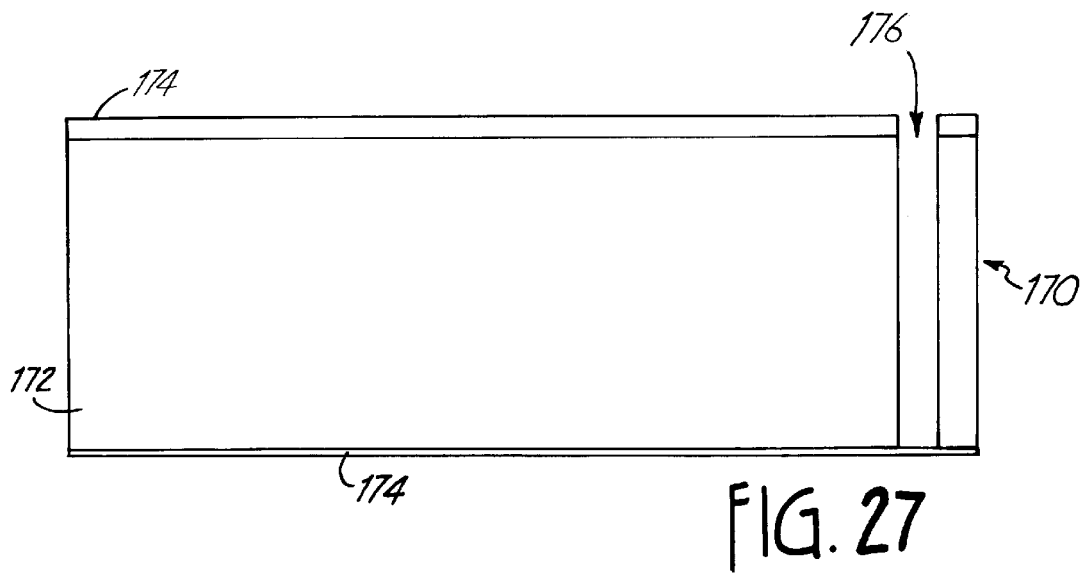
FIGS. 27–36 are cross sectional views of the bottom structure taken along cut line A—A of FIG. 4 illustrating an alternate embodiment of the present invention.

FIGS. 27 through 36 are cross sectional views of a bottom structure 170 illustrating yet another process flow of the present invention. FIGS. 27 through 36 illustrate a bottom structure 170 having certain through etches, or vias, which extend through the thickness of the structure 170 and allow electrical connections to be made to both sides of the microactuator. FIG. 27 shows a bottom structure 170 formed of a silicon wafer 172. As described above, a conformal oxide 174 is deposited on the surfaces of the structure 170 by either thermal or deposition techniques. Also shown on FIG. 27 is a through hole or via 176. The via 176 is created by using DT-RIE to etch through both the top layer of oxide 174 and the silicon wafer 172, until the etch goes almost completely through the thickness of the structure 170, stopping at the layer of oxide 174 on the bottom of the structure 170.

Figure 28:
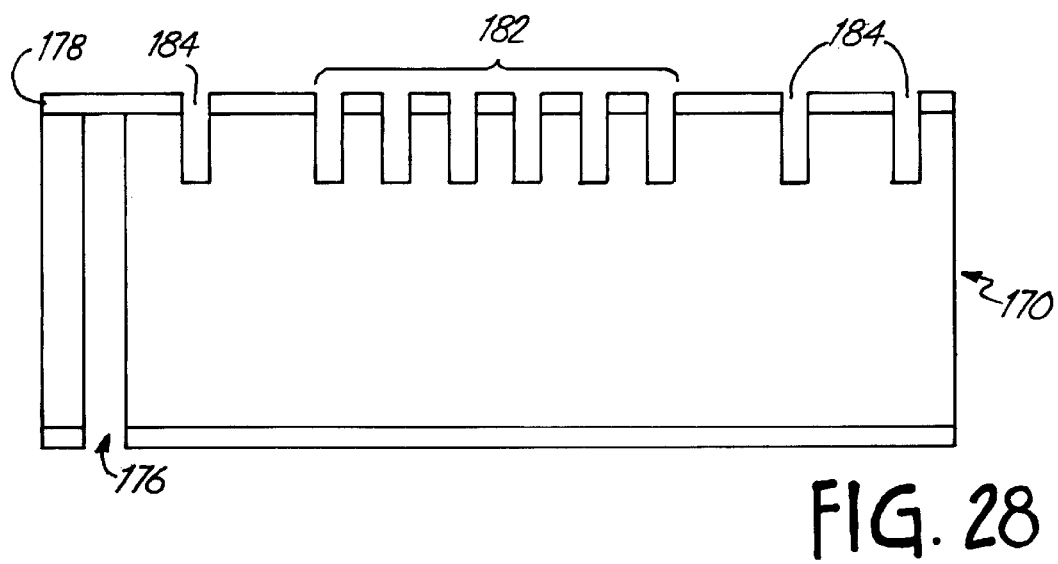

In FIG. 28, the wafer has been inverted so that the via 176 now begins on the bottom of the structure 170 as viewed in FIG. 28. The next step in the process flow is to apply a photoresist/oxide mask 178 to the top surface of the structure 170. This mask 178 is used in a DT-RIE process to etch trenches 182 and 184 for the coil and embedded wires, respectively. Once the trenches 182, 184 are formed, the mask layer 178 is stripped.

Figure 29:
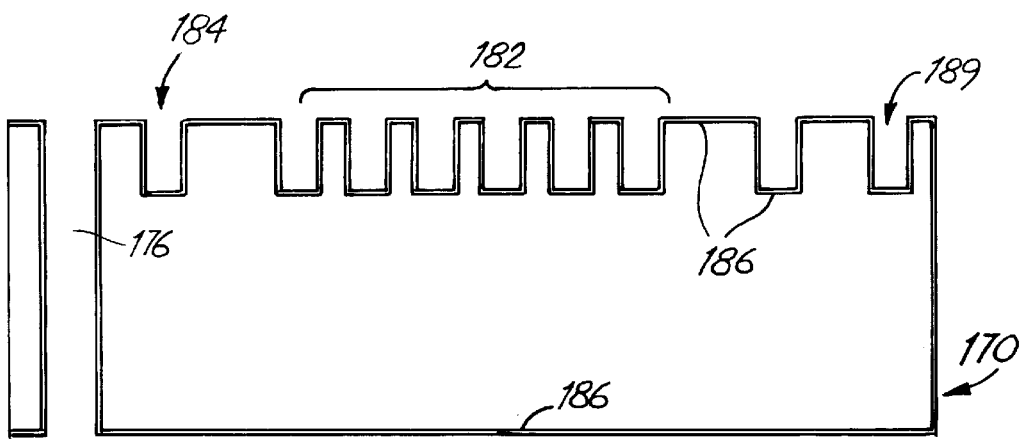
Figure 30:
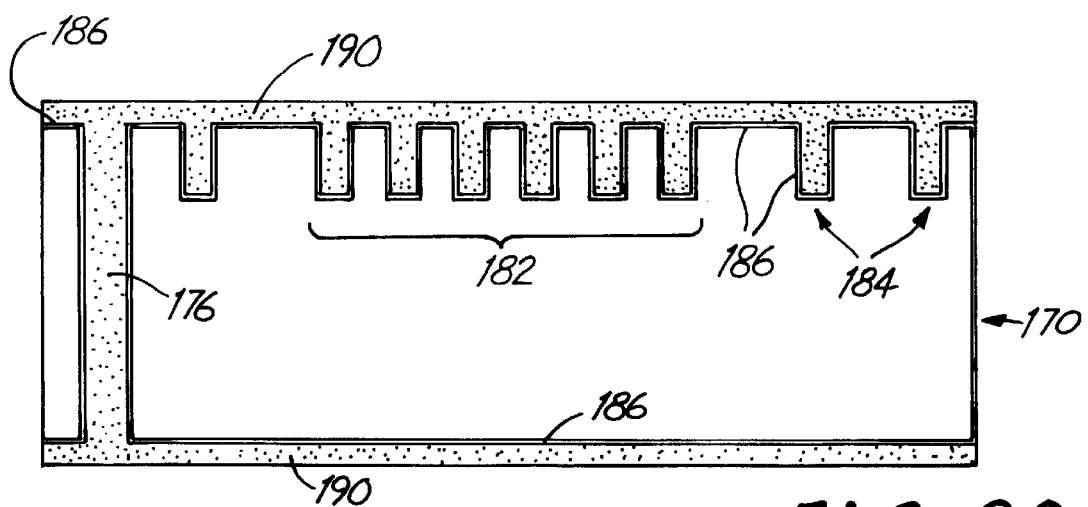
Figure 31:
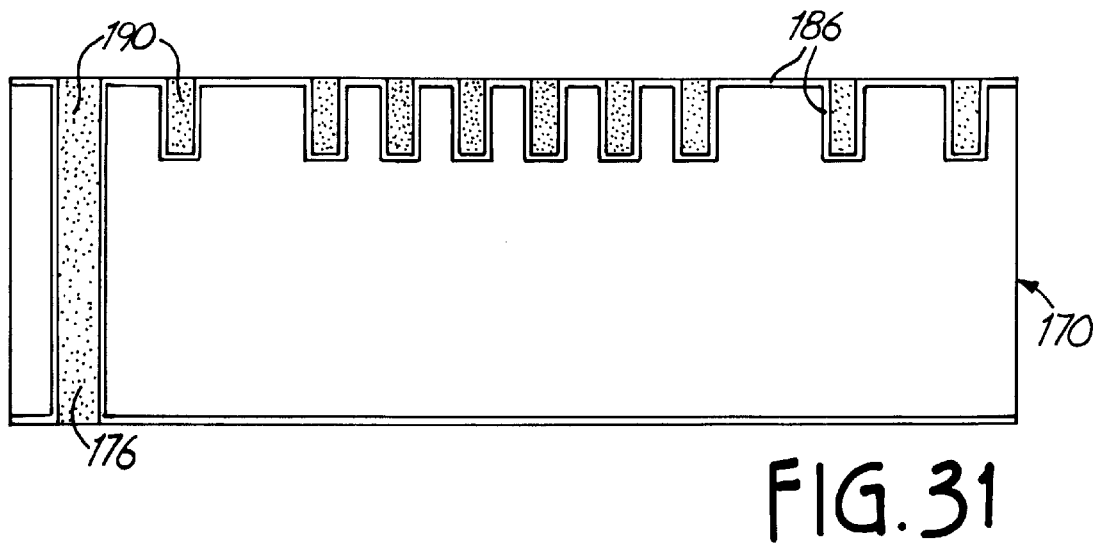

FIG. 29 shows the bottom structure 170 after any masking oxide 178 has been stripped. A conformal oxide 186 has been deposited on both sides of the wafer 170 and likewise coats the trenches 182, 184. After the conformal oxide 186 is deposited, a metal layer 190 is deposited as shown in FIG. 30. The layer of metal 190, preferably copper, may be conformally deposited using MOCVD and a TaN seed layer. The copper 190 is deposited on both surfaces of the wafer 170, and thus deposits in the trenches 180, 182 as well as in the via 176. FIG. 31 shows the bottom structure 170 after the surface copper 190 has been removed from both surfaces of the wafer 170, leaving the surfaces flat and planar. One suitable method of removing the surface copper 190 is by using chemical mechanical planarization (CMP). In addition, any residual slurry is cleaned off the wafer in a post CMP cleaning system.

Figure 32:
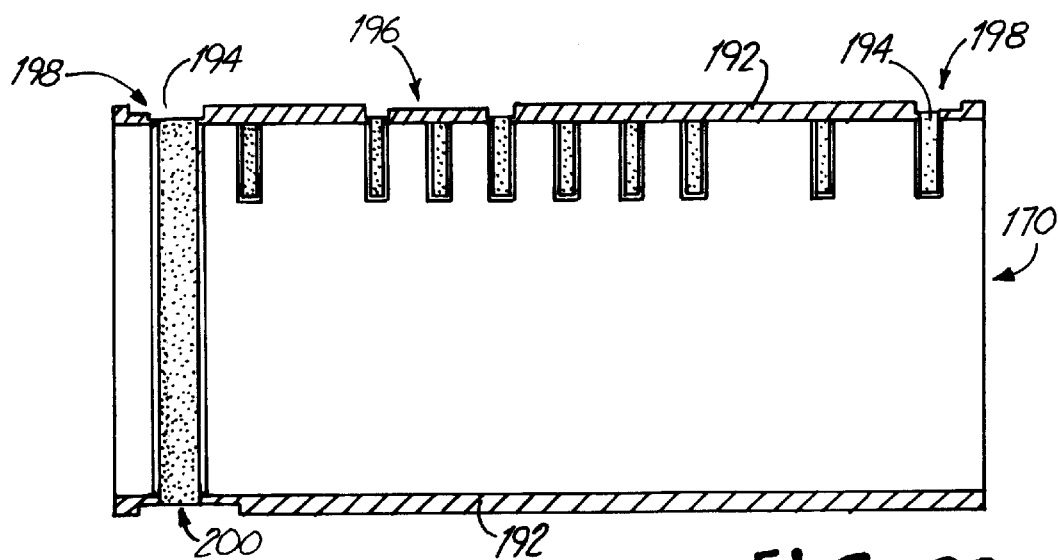

FIG. 32 shows the cross section of the bottom wafer 170 after a silicon dioxide layer 192 has been deposited by PECVD on the surface of the wafer 170. Electrical connect vias 194 are patterned and etched in the silicon dioxide 192 layer. The electrical connect vias 194 extend through the silicon dioxide 192 to the copper 190 of the embedded wires 182, 184 so that when the bond pads 76 are deposited, an electrical connection can be made from the bond pads 76 to the embedded wires 182, 184. The patterns for the jumper 196 and the top bond pads 198 are also etched into the silicon dioxide 192. On the bottom of the wafer 170 as viewed in FIG. 22F, the pattern for a bottom bond pad 200 is likewise etched into the silicon dioxide 192.

Figure 33:
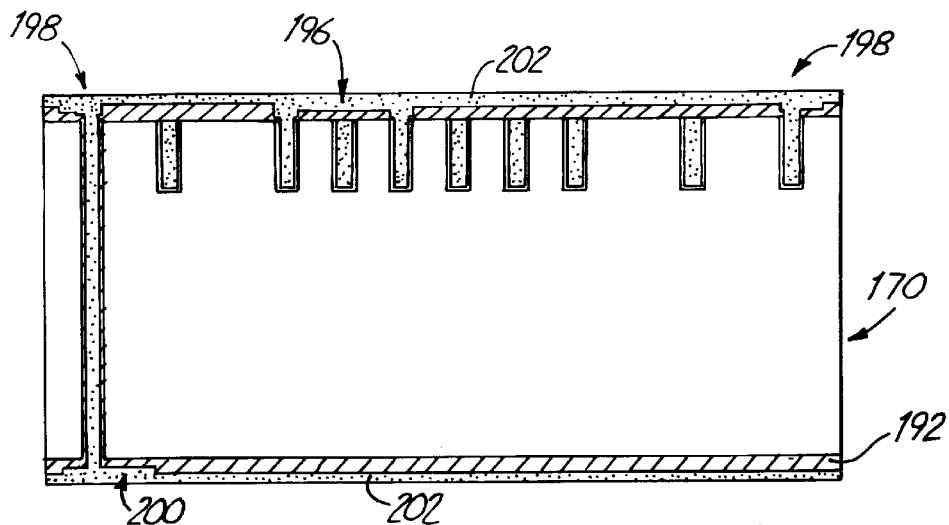
Figure 34:
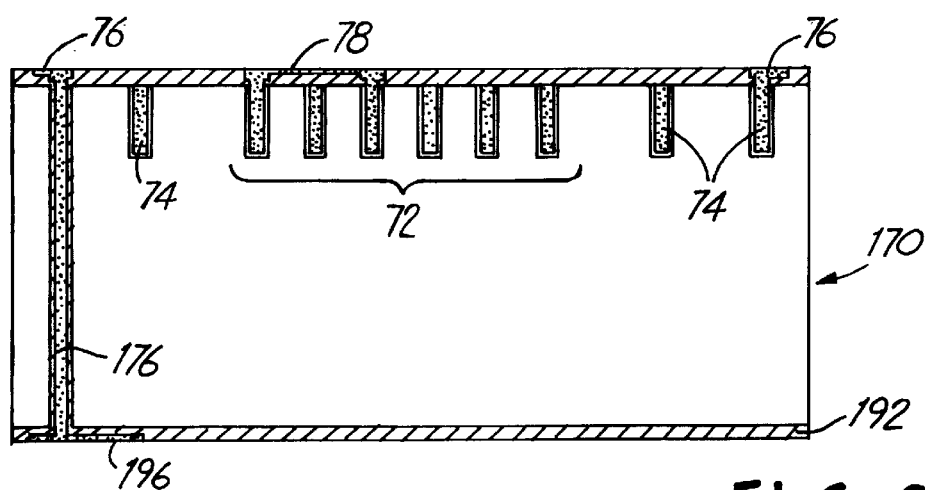

Next, as shown in FIG. 33, a second layer of copper 202 is conformally deposited on both sides of the wafer 170. Once again, the copper 202 may be deposited using a TaN seed layer and MOCVD process. The copper 202 deposits in the etched silicon dioxide 192 to fill the patterns for the bond pads 198, 200, and the jumper 196. In FIG. 34, the surface copper 202 on both sides of the structure 170 has been removed using chemical mechanical planarization, and any residual slurry is cleaned off the surface with post CMP cleaning system. Thus, FIG. 34 illustrates the now formed copper jumper 78, top bond pads 76, bottom bond pad 196, embedded coil 72, embedded wires 74, and via 176.

Figure 35:
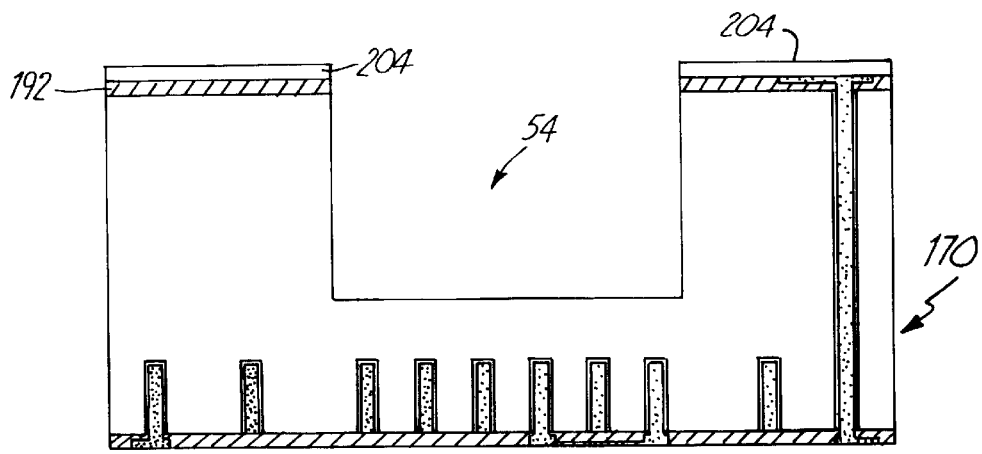
Figure 36:
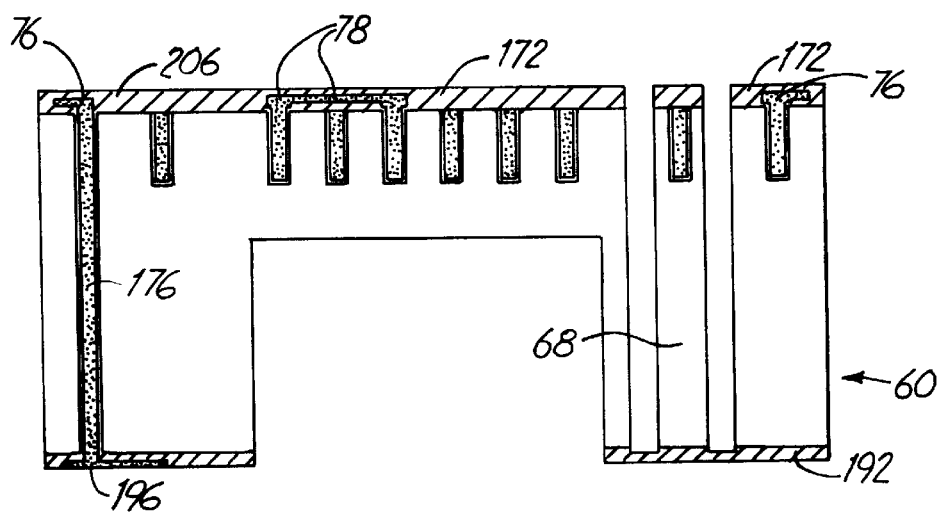

FIGS. 35 and 36 illustrate the structural formation steps in the process flow. In FIG. 35, the bottom wafer 170 has been inverted and a photoresist mask 204 has been patterned on the back side of the wafer 170. The photoresist mask 204 creates the pattern for etching the bottom keeper tub 54. The keeper tub 54 is etched using reactive ion or deep trench reactive ion etching. Once the tub 54 is etched, the photoresist mask 204 is stripped.

Finally, in FIG. 36, the final structural etching is performed to create the flexible beams 68, 70. An oxide mask 206 is applied to the top surface of the wafer 170 to create the pattern for the structural etching of the beams 68, 70 and the beams 68, 70 are etched (due to a non-symmetrical cut line A—A, only one beam 68 is shown in FIG. 36). If made at the wafer level, the final step is to strip or etch any of the remaining back side oxide 192 away to allow the bottom structures 170 to be released from the bottom wafer. Alternatively, the back side of the wafer can be patterned and etched away prior to the step illustrated in FIG. 35.

The benefits and features this previously disclosed fabrication process and resulting structure include the following. Previous moving magnetic microactuators had the magnets placed on the rotor with the coil suspended above, typically by using a flex circuit. Placing embedded coils on the rotor rather than placing the magnets on the rotor, along with embedding the interconnects along the spring beams, results in a lower microactuation mass and hence less inertia and high achievable resonance frequencies. Using deep trench reactive ion etching rather than attempting to form the coils on the surface of the wafer allows for closely spaced high aspect ratio and mechanically robust coils. The embedded electrical connections from the stator to the rotor along the thin spring beams also minimize or eliminate the need for external electrical connection to the rotor element. In the past, such external electrical connection caused unwanted mechanical biasing against the rotor spring.

Etching the mechanical stand offs on the top keeper wafer minimizes the topology on the bottom rotor and stator wafer. This along with the current method results a planar surface which simplifies the photolithography on the complicated deep trench reactive ion etching used to create the beams. Finally, when forming both the top and bottom structures at the wafer level, and using wafer level bonding, the manufacturing process is greatly simplified. However, it is also possible to practice the present invention by performing the process at the die level.

Although the present invention has been described with reference to preferred embodiments, workers skilled in the art will recognize that changes may be made in form and detail without departing from the spirit and scope of the invention.

What is claimed is:

1. A microactuator for finely positioning a transducing head adjacent a select radial track of a disc, the microactuator comprising:

a bottom structure for supporting a slider, the bottom structure comprising a rotor and a stator, wherein the rotor comprises a coil embedded into a surface of the rotor; and a top structure carrying a magnet and bonded to the bottom structure.

2. The microactuator of claim 1 wherein the top structure further comprises mechanical stand-offs and the top structure is bonded to the bottom structure so that an air gap is formed between the magnet carried by the top structure and the embedded coil in the bottom structure by the mechanical stand-offs.

3. The microactuator of claim 1 wherein the top structure is formed of a ferromagnetic keeper material.

4. The microactuator of claim 1 wherein the top structure further comprises a top keeper.

5. The microactuator of claim 1 wherein the bottom structure further comprises a wire embedded into a surface of the bottom structure connecting the embedded coil on the rotor to a bond pad on the stator.

6. The microactuator of claim 5 wherein the bottom structure further comprises flexible beam springs and the embedded wire is located on the flexible beam spring.

7. The microactuator of claim 1 wherein the bottom structure further comprises a bottom keeper located between the embedded coil and the surface of the disc.

8. The microactuator of claim 1 wherein the embedded coil further comprises a jumper embedded into the surface of the rotor.

9. The microactuator of claim 1 and further comprising a via and via bond pads.

10. A dual structure microactuator for positioning a transducing head relative to a select track of a disc, the dual structure microactuator comprising:

a first structure having a stator and a rotor, wherein the rotor comprises a coil embedded into a surface of the rotor; and a second structure carrying a magnet and comprising mechanical stand-offs; wherein the first structure is attached to the second structure.

11. The dual structure microactuator of claim 10 wherein the mechanical stand-offs on the second structure are configured to form an air gap between the magnet carried on the second structure and the embedded coil on the first structure when the first structure is attached to the second structure.

12. The dual structure microactuator of claim 10 wherein the second structure is formed of a ferromagnetic keeper material.

13. The dual structure microactuator of claim 10 wherein the first structure further comprises a wire embedded into the surface of the rotor connecting the embedded coil on the rotor to a bond pad on the stator.

14. The dual structure microactuator of claim 13 wherein the first structure further comprises a flexible beam spring and the embedded wire is located on the flexible beam spring.

15. The dual structure microactuator of claim 10 wherein the first structure further comprises a keeper located between the embedded coil and a surface of the disc.

16. The dual structure microactuator of claim 10 wherein the embedded coil further comprises a jumper embedded into the surface of the rotor.

17. A dual structure microactuator having a stator and a rotor for finely positioning a slider above a surface of a disc, the dual structure microactuator comprising:

a first structure comprising a coil embedded in a surface of the first structure so that the surface remains essentially planar; and a second structure comprising a magnet;

wherein the second structure is attached to the first structure so that a gap is formed between the magnet of the second structure and the embedded coil of the first structure.

18. The dual structure microactuator of claim 17 wherein the second structure further comprises mechanical stand-offs to form the gap between the magnet of the second structure and the embedded coil of the first structure.

19. The dual structure microactuator of claim 17 wherein the first structure comprises the stator and rotor, and wherein the embedded coil is located on the rotor and further comprising embedded wires on the stator.

20. The dual structure microactuator of claim 17 and further comprising keepers located on the first and second structures.

* * * * *

UNITED STATES PATENT AND TRADEMARK OFFICE
CERTIFICATE OF CORRECTION

PATENT NO.       : 6,661,617 B1
APPLICATION NO.  : 09/657884
DATED            : December 9, 2003
INVENTOR(S)      : Roger Lee Hipwell, Jr. et al.

It is certified that error appears in the above-identified patent and that said Letters Patent is hereby corrected as shown below:

Col. 2,
Line 35, delete "utilize", insert -- utilizes --

Signed and Sealed this

Thirtieth Day of January, 2007

JON W. DUDAS
*Director of the United States Patent and Trademark Office*